United States Patent
Pearson et al.

(10) Patent No.: US 10,386,069 B2
(45) Date of Patent: Aug. 20, 2019

(54) GAS TURBINE ENGINE WALL

(71) Applicant: General Electric Company, Schenectady, NY (US)

(72) Inventors: Shawn Michael Pearson, West Chester, OH (US); Robert Frederick Bergholz, Loveland, OH (US); Douglas Ray Smith, Hamilton, OH (US); Frederick Alan Buck, Sharonville, OH (US); Stephen Mark Molter, Cincinnati, OH (US); Kevin Robert Feldmann, Mason, OH (US)

(73) Assignee: General Electric Company, Schenectady, NY (US)

( * ) Notice: Subject to any disclaimer, the term of this patent is extended or adjusted under 35 U.S.C. 154(b) by 219 days.

(21) Appl. No.: 14/407,076

(22) PCT Filed: Jun. 13, 2013

(86) PCT No.: PCT/US2013/045619
§ 371 (c)(1),
(2) Date: Dec. 11, 2014

(87) PCT Pub. No.: WO2013/188645
PCT Pub. Date: Dec. 19, 2013

(65) Prior Publication Data
US 2015/0159871 A1   Jun. 11, 2015

Related U.S. Application Data

(60) Provisional application No. 61/659,083, filed on Jun. 13, 2012.

(51) Int. Cl.
*F01D 5/18* (2006.01)
*F23R 3/06* (2006.01)
(Continued)

(52) U.S. Cl.
CPC ............... *F23R 3/04* (2013.01); *F01D 5/186* (2013.01); *F23R 3/002* (2013.01); *F23R 3/06* (2013.01);
(Continued)

(58) Field of Classification Search
CPC .............. F23R 2900/03042; F23R 3/06; F23R 2009/03041; F23R 2900/03041; F05D 2260/202; F05D 2260/20; F01D 5/187
See application file for complete search history.

(56) References Cited

U.S. PATENT DOCUMENTS 4,303,374 A   12/1981   Braddy
4,664,597 A   5/1987   Auxier et al.
(Continued)

FOREIGN PATENT DOCUMENTS

CN   101839483 A   9/2010
EP   1609949 A1   12/2005
(Continued)

OTHER PUBLICATIONS

Unofficial English Translation of Chinese Office Action issued in connection with corresponding CN Application No. 201380031113.1 dated Aug. 5, 2015.
(Continued)

*Primary Examiner* — William H Rodriguez
*Assistant Examiner* — Kyle Robert Thomas
(74) *Attorney, Agent, or Firm* — General Electric; James Reed

(57) ABSTRACT

A gas turbine engine wall is provided. The wall includes an inner surface and an opposing outer surface having at least one film cooling hole defined therein. The at least one film cooling hole includes an inclined inlet bore that extends from the inner surface and a pair of channels that diverge laterally from an outlet end of the inclined inlet bore. The
(Continued)

pair of channels have a substantially constant width and are separated by a ridge to form a boomerang cross-sectional shape.

14 Claims, 7 Drawing Sheets

(51) Int. Cl.
*F23R 3/04* (2006.01)
*F23R 3/00* (2006.01)

(52) U.S. Cl.
CPC ............... *F05D 2260/202* (2013.01); *F23R 2900/03042* (2013.01); *Y02T 50/676* (2013.01)

(56) References Cited

U.S. PATENT DOCUMENTS

| | | | |
|---|---|---|---|
| 4,669,957 A | 6/1987 | Phillips et al. | |
| 4,676,719 A | 6/1987 | Auxier et al. | |
| 4,684,323 A | 8/1987 | Field | |
| 4,705,455 A | 11/1987 | Sahm et al. | |
| 4,726,735 A | 2/1988 | Field et al. | |
| 4,738,588 A | 4/1988 | Field et al. | |
| 4,762,464 A | 8/1988 | Vertz et al. | |
| 4,770,608 A | 9/1988 | Anderson et al. | |
| 4,923,371 A | 5/1990 | Ben-Amoz | |
| 5,030,060 A | 7/1991 | Liang | |
| 5,062,768 A | 11/1991 | Marriage | |
| 5,281,084 A | 1/1994 | Noe et al. | |
| 5,370,499 A | 12/1994 | Lee | |
| 5,382,133 A | 1/1995 | Moore et al. | |
| 5,419,681 A | 5/1995 | Lee | |
| 5,458,461 A | 10/1995 | Lee et al. | |
| 5,577,889 A | 11/1996 | Terazaki et al. | |
| 5,624,231 A | 4/1997 | Ohtomo et al. | |
| 5,649,806 A | 7/1997 | Scricca et al. | |
| 5,651,662 A | 7/1997 | Lee et al. | |
| 5,653,110 A | 8/1997 | Lee et al. | |
| 5,700,131 A | 12/1997 | Hall et al. | |
| 6,022,188 A | 2/2000 | Bancalari | |
| 6,099,253 A | 8/2000 | Fukue et al. | |
| 6,129,515 A | 10/2000 | Soechting et al. | |
| 6,183,199 B1 | 2/2001 | Beeck et al. | |
| 6,241,468 B1 | 6/2001 | Lock et al. | |
| 6,267,552 B1 | 7/2001 | Weigand | |
| 6,270,317 B1 | 8/2001 | Manning et al. | |
| 6,287,075 B1 | 9/2001 | Kercher | |
| 6,368,060 B1 | 4/2002 | Fehrenbach et al. | |
| 6,435,814 B1 | 8/2002 | Yu et al. | |
| 6,474,947 B1 | 11/2002 | Yuri | |
| 6,506,013 B1 | 1/2003 | Burdgick et al. | |
| 7,328,580 B2 | 2/2008 | Lee et al. | |
| 8,057,179 B1* | 11/2011 | Liang .................. F01D 5/186 | |
| | | | 415/115 |
| 8,850,788 B2 | 10/2014 | Eroglu et al. | |
| 9,598,979 B2* | 3/2017 | Reed .................... F01D 25/12 | |
| 2002/0172596 A1 | 11/2002 | Kohli et al. | |
| 2003/0007864 A1 | 1/2003 | Shelton et al. | |
| 2003/0152460 A1 | 8/2003 | Haselbach et al. | |
| 2003/0231955 A1 | 12/2003 | Barry et al. | |
| 2004/0179940 A1 | 9/2004 | Liang | |
| 2005/0042074 A1 | 2/2005 | Liang | |
| 2005/0047914 A1 | 3/2005 | Tomberg | |
| 2005/0129515 A1 | 6/2005 | Beddard et al. | |
| 2005/0135931 A1 | 6/2005 | Nakamata et al. | |
| 2005/0163609 A1 | 7/2005 | Riahi et al. | |
| 2005/0220618 A1 | 10/2005 | Zhang et al. | |
| 2005/0232768 A1 | 10/2005 | Heeg et al. | |
| 2005/0286998 A1* | 12/2005 | Lee ...................... B23K 26/384 |
| | | | 415/117 |
| 2006/0002788 A1 | 1/2006 | Liang | |
| 2006/0073015 A1 | 4/2006 | Liang | |
| 2006/0099074 A1 | 5/2006 | Kopmels | |
| 2006/0263217 A1 | 11/2006 | Spanks et al. | |
| 2007/0025852 A1 | 2/2007 | Camhi et al. | |
| 2007/0048133 A1 | 3/2007 | Palmer et al. | |
| 2010/0040459 A1* | 2/2010 | Ohkita ................... F01D 5/186 |
| | | | 415/177 |
| 2013/0175015 A1* | 7/2013 | Tanaka ................... F01D 5/186 |
| | | | 165/168 |
| 2013/0205786 A1 | 8/2013 | Kohli et al. | |
| 2013/0205787 A1 | 8/2013 | Zelesky et al. | |
| 2013/0205790 A1 | 8/2013 | Xu et al. | |
| 2013/0205791 A1 | 8/2013 | Mongillo et al. | |
| 2013/0205792 A1 | 8/2013 | Gleiner et al. | |
| 2013/0205793 A1 | 8/2013 | Xu et al. | |
| 2013/0205794 A1 | 8/2013 | Xu et al. | |
| 2013/0205801 A1 | 8/2013 | Xu et al. | |
| 2013/0205802 A1 | 8/2013 | Levasseur et al. | |
| 2013/0205803 A1 | 8/2013 | Xu et al. | |
| 2013/0206733 A1 | 8/2013 | Levasseur et al. | |
| 2013/0209227 A1 | 8/2013 | Xu et al. | |
| 2013/0209228 A1 | 8/2013 | Xu et al. | |
| 2013/0209229 A1 | 8/2013 | Xu et al. | |
| 2013/0209233 A1 | 8/2013 | Xu et al. | |
| 2013/0209234 A1 | 8/2013 | Xu et al. | |
| 2013/0209235 A1 | 8/2013 | Xu et al. | |
| 2013/0209236 A1 | 8/2013 | Xu et al. | |
| 2013/0209269 A1 | 8/2013 | Gleiner et al. | |

FOREIGN PATENT DOCUMENTS

| | | | |
|---|---|---|---|
| EP | 1798474 A2 | 6/2007 | |
| EP | 1873353 A2 | 1/2008 | |
| EP | 2390465 A2 | 11/2011 | |
| JP | H1089005 A | 4/1998 | |
| JP | 1162507 A | 3/1999 | |
| WO | WO 2011118131 A1 * | 9/2011 | ............. F01D 5/186 |

OTHER PUBLICATIONS

Search Report and Written Opinion issued in connection with corresponding PCT application PCT/US2013/045619 dated Dec. 16, 2013.

* cited by examiner

GAS TURBINE ENGINE WALL

CROSS-REFERENCE TO RELATED APPLICATIONS

This application is a non-provisional application and claims priority to U.S. Provisional Patent Application Ser. No. 61/659,083 filed Jun. 13, 2012 for "FILM COOLING OF TURBINE ENGINES", which is hereby incorporated by reference in its entirety.

BACKGROUND OF THE INVENTION

The field of the invention relates generally to turbine engines, and more specifically to film cooling of turbine engines.

In a gas turbine engine, air pressurized in a compressor is mixed with fuel in a combustor to generate hot combustion gases. Energy is initially extracted from the gases in a high pressure turbine (HPT) that powers the compressor, and subsequently in a low pressure turbine (LPT) that powers a fan in a turbofan aircraft engine application, or powers an external shaft for marine and/or industrial applications.

Generally, engine efficiency increases as the temperature of combustion gases is increased, but the increased gas temperature increases the operating temperature of various components along the gas flowpath, which in turn increases the need for cooling such components to facilitate extending their useful life.

For example, known combustors include outer and inner liners which require cooling during operation. Known turbine nozzles include hollow vanes which also require cooling. In at least some turbine engines, flowpath components exposed to hot combustion gases are cooled using compressor bleed air, which subsequently reduces engine efficiency since the bled air is not used in the combustion process. For example, at least some known components channel the compressor bleed air through film cooling holes.

At least some known cooling holes are formed from a cylindrical bore that is oriented at a shallow angle through the heated wall to enable a film of cooling air to be discharged along the external surface of the wall. Discharging the air at a shallow angle reduces the likelihood of undesirable blow-off and/or flow separation. The amount of surface area to be film cooled is typically only increased by increasing the number of cooling holes and thus increases the amount of air discharged therefrom. However, increasing the amount of cooling air decreases engine efficiency.

To improve the efficiency of known cooling holes, at least some cooling holes are formed with a divergent discharge end to diffuse the cooling air as it is discharged from the cooling hole outlet.

However, diffusion in film cooling holes may be limited due to the half-angle of the diffusion outlet to prevent flow separation. For example, within known cooling holes, the diffusion angle may be limited to about ten degrees on each side of the outlet to prevent overexpansion of the discharge cooling air which could lead to undesirable film separation.

Accordingly, it is desired to provide an improved film cooling hole that can produce increased film coverage without increasing the amount of cooling air required and without increasing the likelihood of flow separation of the film cooling air.

BRIEF DESCRIPTION OF THE INVENTION

In aspect, a gas turbine engine wall is provided. The wall includes an inner surface and an opposing outer surface having at least one film cooling hole defined therein. The at least one film cooling hole includes an inclined inlet bore that extends from the inner surface and a pair of channels that diverge laterally from an outlet end of the inclined inlet bore. The pair of channels have a substantially constant width and are separated by a ridge to form a boomerang cross-sectional shape.

In another aspect, a gas turbine engine wall is provided. The wall includes an inner surface and an opposing outer surface having at least one film cooling hole defined therein. The at least one film cooling hole comprises an inclined inlet bore that extends from the inner surface and a pair of channels that diverge laterally from an outlet end of the inclined inlet bore. The pair of channels have a substantially planar floor and are separated by a ridge to form a boomerang cross-sectional shape.

DETAILED DESCRIPTION OF THE INVENTION

Figure 1:
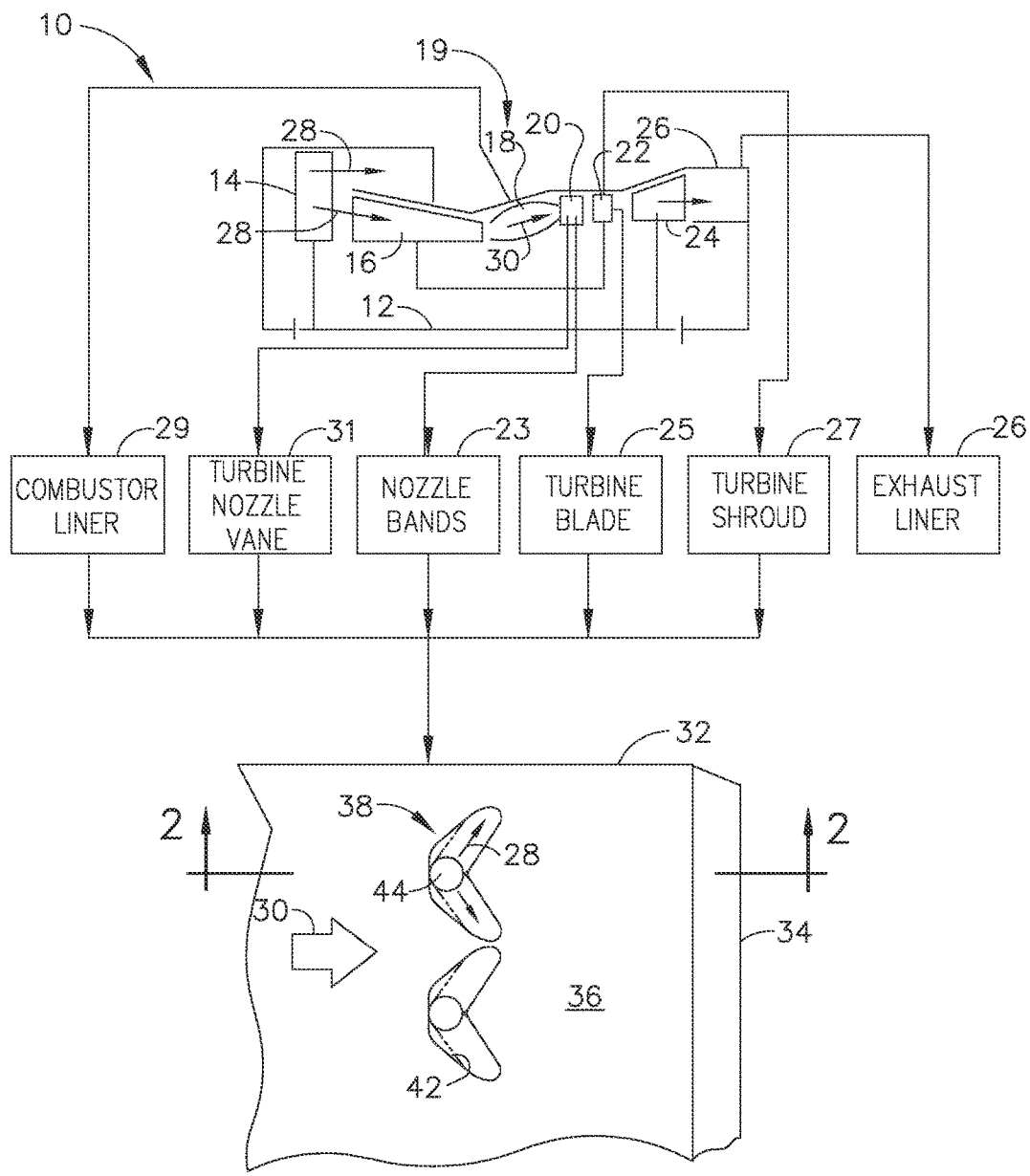
FIG. 1 is a schematic view of an exemplary gas turbine engine including various components that are cooled by a row of boomerang film cooling holes.

FIG. 1 is a schematic view of an exemplary turbine engine 10 that includes a longitudinal or axial centerline axis 12. In the exemplary embodiment, engine 10 is a gas turbine engine that includes in serial flow communication, a fan 14, a multistage axial compressor 16, and an annular combustor 18. Engine 10 also includes a high pressure turbine (HPT) 19 and a low pressure turbine (LPT) 24 that are each downstream from combustor 18.

HPT 19 includes a turbine nozzle 20 having a row of hollow stator vanes (not shown) supported in inner and outer nozzle bands 23. A first stage turbine 22 is downstream from first stage turbine nozzle (not shown) and includes a row of hollow rotor blades 25 that extend radially outwardly from a supporting rotor disk (not shown) and that are surrounded by an annular turbine shroud 27.

Low pressure turbine (LPT) 24 is coupled downstream from high pressure turbine 19 and includes additional nozzles and rotor blades (not shown) which may or may not include internal cooling circuits depending upon the engine design. An exhaust liner 26 extends downstream from low pressure turbine 24.

Each component to be cooled, i.e. liner 26, includes at least one wall 32 formed from a thin metallic material. More specifically, wall 32 is typically formed of a conventional superalloy metal, such as a cobalt-based material that has a high strength at the elevated temperatures experienced during operation of turbine engine 10 and that can withstand the heating generated by exposure to hot combustion gases 30.

During operation, ambient air is pressurized by fan 14 to form pressurized air 28. A lower portion of air 28 enters compressor 16 for additional pressurization while another portion of air 28 is discharged from a fan outlet to provide propulsion thrust in a turbofan engine application (not shown). Air 28 discharged from the compressor 16 is mixed with fuel in combustor 18 to generate hot combustion gases 30. Combustion gases 30 flow downstream through various turbine blade stages which extract energy therefrom to power compressor 16 and fan 14 during turbine operation.

Engine 10 may have any conventional configuration and operation, and as such, the invention described herein is not limited to only being used with engine 10. Rather, any one or more of the various engine components disclosed herein, or any component subject to heating from combustion gases 30 may be used with the invention described herein. More specifically, any component requiring cooling that includes a wall 32, a portion of which is illustrated in FIG. 1, may be cooled by the invention described herein.

Wall 32 includes opposite inner and outer wall surfaces 34 and 36, respectively. Inner or inboard surface 34 forms an outer boundary of a suitable cooling circuit formed in wall 32 and receives pressurized air from compressor 16. Outer surface 36 is exposed to high temperature combustion gases 30 during operation and requires suitable film cooling protection.

Wall 32 may be a portion of inner or outer combustor liners 29, a portion of turbine nozzle vanes 31, a portion of turbine nozzle bands 23, a portion of turbine rotor blades 25, a portion of turbine shroud 27, and/or a portion of exhaust liner 26.

In the exemplary embodiment, cooling holes 38 are arranged in a suitable row that is oriented along a span of wall 32. More specifically, in the exemplary embodiment, film cooling holes 38 each have a boomerang configuration.

Figure 2:
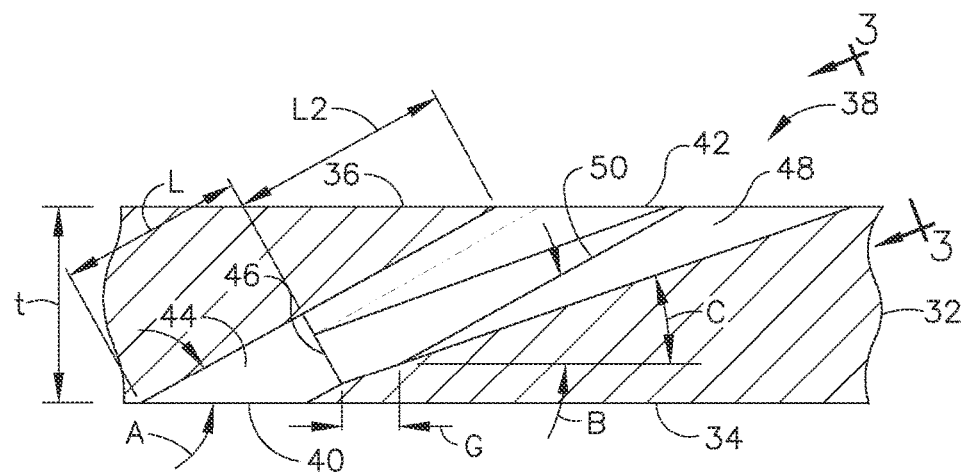
FIG. 2 is a cross-sectional view through one of the boomerang cooling holes illustrated in FIG. 1 and taken along line 2-2.
Figure 3:
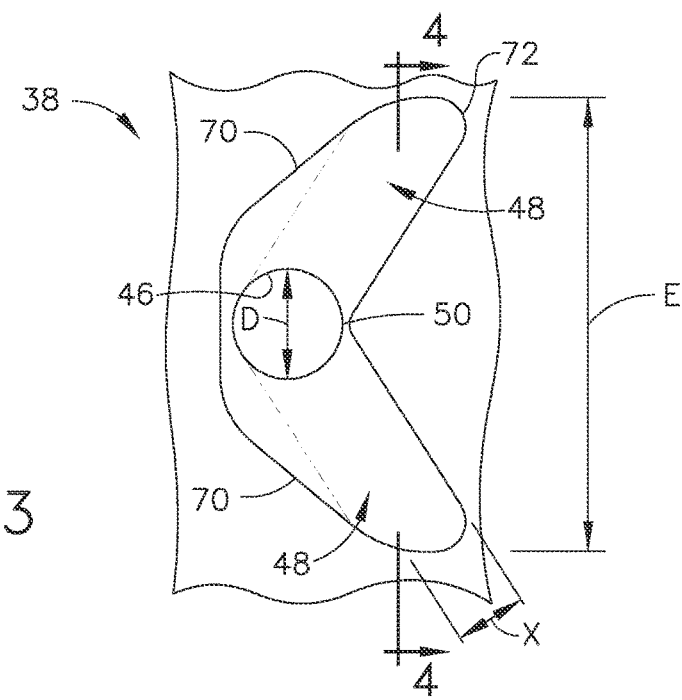
FIG. 3 is an axial view of the boomerang cooling hole shown in FIG. 2 and taken along line 3-3.
Figure 4:
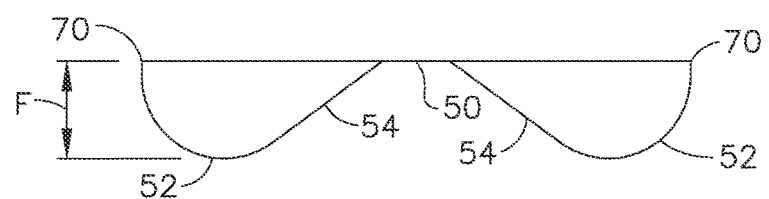
FIG. 4 is a cross-sectional view of the boomerang outlet shown in FIG. 3 and taken along line 4-4.

FIGS. 2-4 illustrate views of cooling hole 38. In the exemplary embodiment, each hole 38 extends longitudinally through wall 32 and diverges both longitudinally along hole 38 and laterally across a width, or thickness t, of hole 38 between an inlet 40 and an outlet 42. In the exemplary embodiment, inlet 40 is substantially flush with inner surface 34, and outlet 42 is substantially flush with outer surface 36. Each hole 38 includes a substantially cylindrical inlet bore 44 that defines a substantially constant flow area between its inlet end 40 and its outlet end 46. Bore 44 is oriented at an angle or is inclined relative to wall 32 at an inclination angle A. Angle A may be any angle that enables hole 38 to function as described in more detail herein, such as, for example, between 20° and 45°.

In the exemplary embodiment, bore 44 terminates at its outlet end 46 in a pair of legs or channels 48 that extend outwardly to wall outer surface 36. Channels 48 are separated by a ridge 50 that has a substantially constant lateral width Y (shown in FIG. 8). Ridge 50 is spaced a distance G (shown in FIG. 2) from outlet end 46 and decreases in depth as ridge 50 extends towards wall outer surface 36.

In the exemplary embodiment, each channel 48 is at least partially defined by an arcuate or rounded floor 52 that has a substantially constant width X and by a sidewall 54 that extends from rounded floor 52 to ridge 50. Alternatively, channel width X increases with distance from outlet end 46 at any angle that enables hole 38 to function as described herein. Floor 52 also defines an outer edge 70 of boomerang outlet 42. Channels 48 diverge from each other at outlet end 46 at an angle DFA and in the exemplary embodiment, are substantially symmetrical. Channels 48 diverge from each other at ridge 50 at an angle DFA2. Angles DFA and DFA2 (shown in FIGS. 8 and 9) may be any angle that enables hole 38 to function as described herein, such as, for example, between about 20° to about 100°.

In the exemplary embodiment, inlet bore 44 is oriented at an oblique angle A relative to wall inner surface 34, along which it receives pressurized air 28 (shown in FIG. 1) from compressor 16 to facilitate cooling wall 32 during operation. As shown in FIG. 2, channels 48 diverge longitudinally between bore outlet end 46 and wall outer surface 36 as represented by the difference in inclination angle B of ridge 50 and the inclination angle C of floor 52.

In the exemplary embodiment, channels 48 decrease in depth F between inlet bore 44 and boomerang outlet 42 such that each channel 48 is substantially flush with wall outer surface 36. Moreover, holes 38 increase in area, i.e. their flow area, from inlet bore 44 to boomerang outlet 42 along wall outer surface 36 such that the flow area is distributed within channels 48 to facilitate diffusing pressurized air 28. As such, the discharged film cooling air is discharged from holes 38 and spread generally laterally across width E prior to the flow encountering combustion gases 30 downstream from outlet 42.

Channels 48 diverge from ridge 50 such that a depth of each increases over the axial length of ridge 50 as a result of the difference in inclination angles B and C. In one embodiment, inclination angle A of inlet bore 44 is between about 20° to about 45°; whereas inclination angle B of ridge 50 is smaller than inclination angle A such that ridge 50 intersects wall outer surface 36 at a shallower discharge angle than inlet bore 44. Moreover, in the exemplary embodiment, inclination angle C is smaller than inclination angle B and intersects wall outer surface 36 at an even shallower discharge angle adjacent to a trailing edge 72 of boomerang outlet 42 to facilitate reducing blow-off and/or separation of pressurized air 28.

Referring again to FIGS. 3 and 4, channels 48 diverge from common inlet bore 44 to trailing edge 72. Each channel 48 is defined by a substantially constant width X that may be substantially equal to a diameter D of inlet bore 44. As best seen in FIG. 4 of the exemplary embodiment, channels 48 extend deeper into wall 32 than ridge sidewalls 54 such that a half-teardrop configuration is defined by channels 48 and sidewalls 54. Ridge 50 is a distance G from outlet end 46. Alternatively, ridge 50 may be at any relative distance from outlet end 46 and/or may be defined at outlet end 46.

In the exemplary embodiment, boomerang outlet 42 increases in lateral width E longitudinally along ridge 50 as ridge 50 decreases in depth F from outer surface 36. Moreover, in the exemplary embodiment, channels 48 and ridge 50 increase lateral width E of boomerang outlet 42 and lateral width E may be selected to facilitate optimizing diffusion of discharged pressurized air 28 by separating the flow of the air at ridge 50. Pressurized air 28 is separated by ridge 50 and flows over sidewalls 54 and past rounded floors 52 to facilitate diffusion of air 28 and to provide a film of cooling air over wall outer surface 36.

As such, in the exemplary embodiment, the diffusion of pressurized air 28 discharged through inlet bore 44 is facilitated in boomerang outlets 42 as air 28 is spread laterally by channels 48, particularly at higher blowing ratios. A substantial increase in film cooling coverage may be obtained by varying lateral width E of boomerang outlet 42 to facilitate improved attachment of air 28 along wall outer surface 36 at discharge angles B and C.

Figure 5:
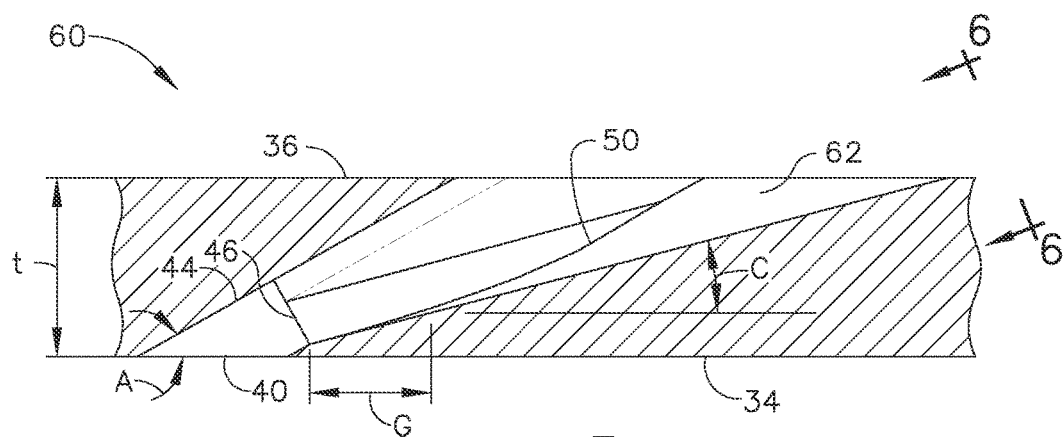
FIG. 5 is a cross-sectional view of an alternative film cooling hole that may be used with the gas turbine engine shown in FIG. 1.
Figure 6:
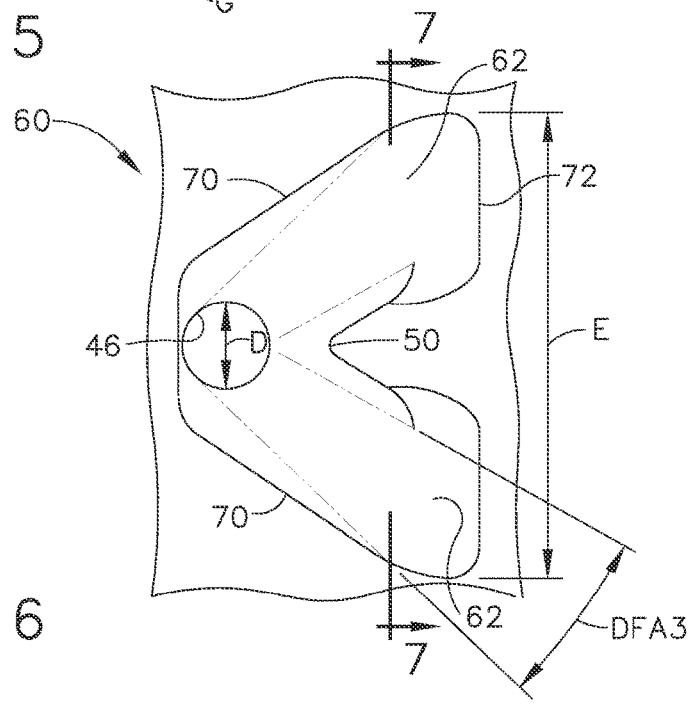
FIG. 6 is an axial view of the cooling hole shown in FIG. 5 and taken along line 6-6.
Figure 7:
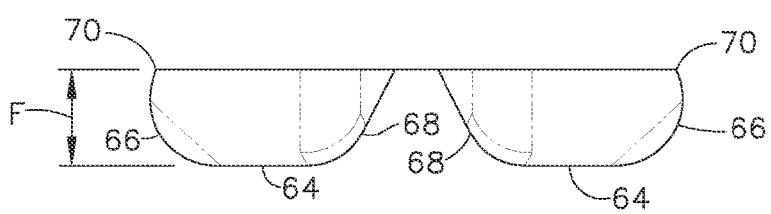
FIG. 7 is a cross-sectional view of the outlet shown in FIG. 6 and taken along line 7-7.

FIGS. 5-7 illustrate an alternate embodiment of a cooling hole, known as a maximo cooling hole 60 that is similar to hole 38 (shown in FIGS. 1-4). In the exemplary embodiment, maximo cooling hole 60 includes a pair of channels 62 that are each defined by substantially planar floors 64. Moreover, each channel 62 includes a pair of rounded sidewalls 66 and 68 that each extend from opposite sides of planar floors 64. Moreover, sidewalls 66 define an outer edge 70 of hole outlet 42 and are each substantially perpendicular to wall outer surface 36. Moreover, sidewalls 68 extend from planar floors 64 to form ridge 50.

Sidewalls 68 are formed with a steeper incline than sidewalls 54 (shown in FIG. 4) and channels 62 are substantially symmetrical. Moreover, channels 62 diverge at an angle DFA3 that is smaller than diverging angle DFA of channels 48 (shown in FIGS. 8 and 9). In the exemplary embodiment, ridge 50 is defined at a distance G from outlet end 46 and decreases in depth from outlet end 46 to outlet 42 in an arcuate profile. In other embodiments, ridge 50 may be substantially linear and/or may extend to outlet end 46.

In the exemplary embodiment, channels 62 increase in width between bore outlet 46 and outlet 42 to facilitate diffusing pressurized air 28 (shown in FIG. 1) discharged from outlet 46. Air 28 discharged from outlet 46 is separated by ridge 50 and is forced through channels 62 wherein the air is diffused by diverging channels 62. Diffused air 28 flows over sidewalls 68 and along a trailing edge 72 of outlet 42. Generally, inclination of the curve of ridge 50 is less than inclination angle A, and inclination angle C of channels 62 is shallower than the inclination of ridge 50 to facilitate increased flow attachment and reduced blow-off as air 28 flows past outer wall surface 36, as compared to air discharged at angle A.

Figure 8:
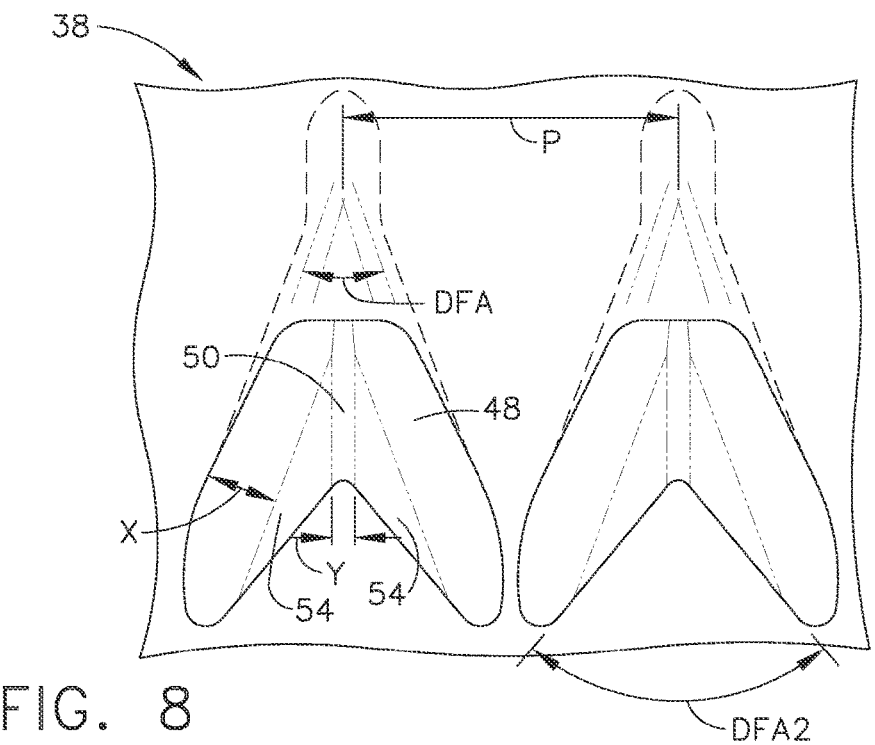
FIG. 8 is a plan view of one of the boomerang cooling holes shown in FIG. 1 and normal to the wall being cooled.
Figure 9:
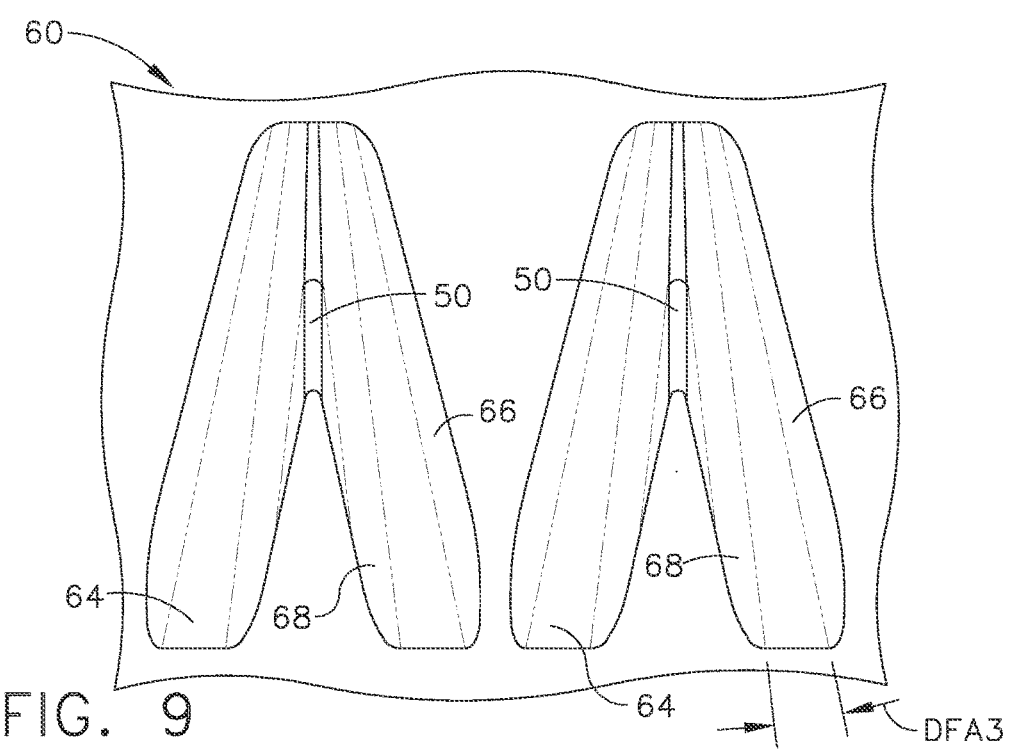
FIG. 9 is a plan view of one of the cooling holes shown in FIG. 5 and normal to the wall being cooled.

FIGS. 8 and 9 are additional views of hole 38 and maximo hole 60, respectively. More specifically, FIG. 8 is a plan view of hole 38 taken substantially normal to wall outer surface 36, and FIG. 9 is a plan view of maximo hole 60 taken substantially normal to wall outer surface 36.

Figure 10:
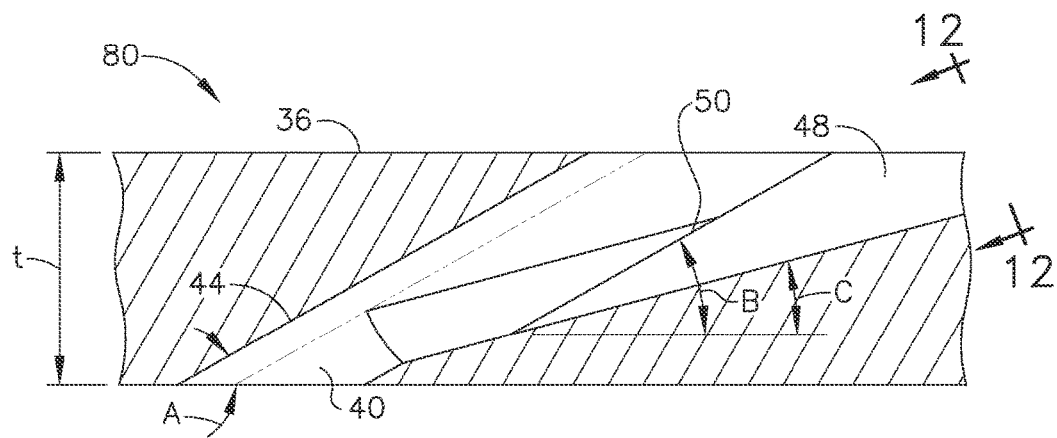
FIG. 10 is a cross-sectional view of an exemplary deep boomerang film cooling hole.
Figure 11:
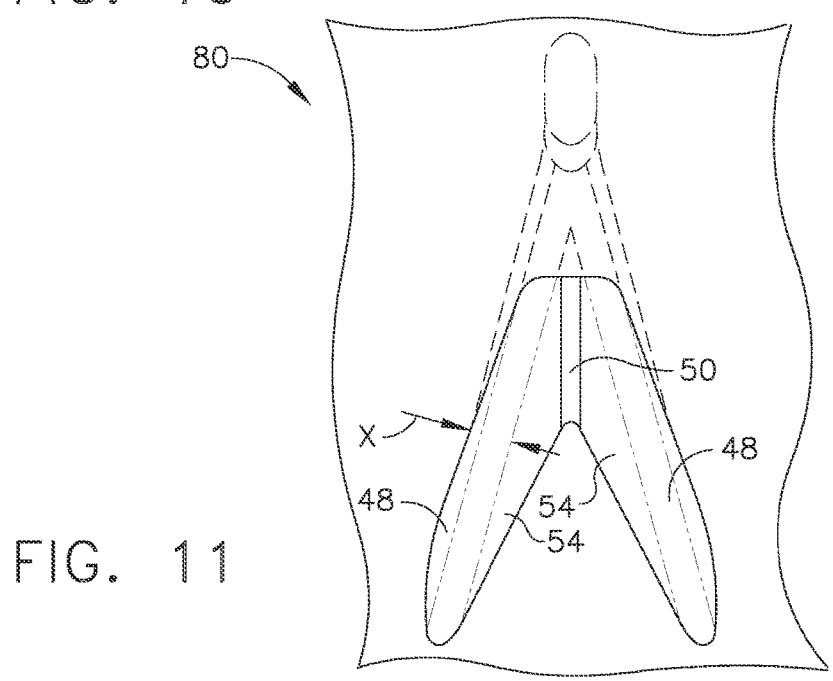
FIG. 11 is a plan view of the boomerang hole shown in FIG. 10 and normal to the wall being cooled.
Figure 12:
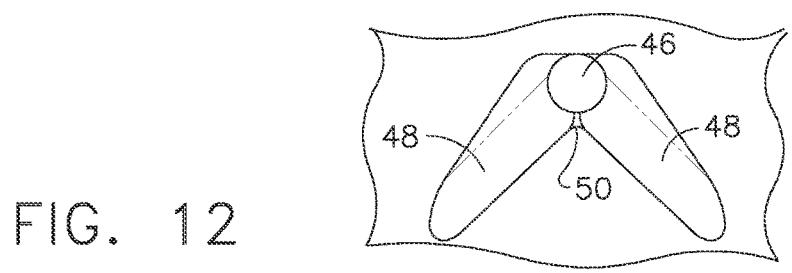
FIG. 12 is an axial view of the boomerang hole shown in FIG. 10 and taken along line 12-12.

FIGS. 10-12 each illustrate an alternative embodiment of the boomerang configuration designated as a deep boomerang hole 80. Cooling hole 80 is similar to hole 38 except that channels 48 each have an increased depth as compared to cooling hole 38, as shown by the difference in inclination angles C (shown in FIGS. 2 and 10).

Figure 13:
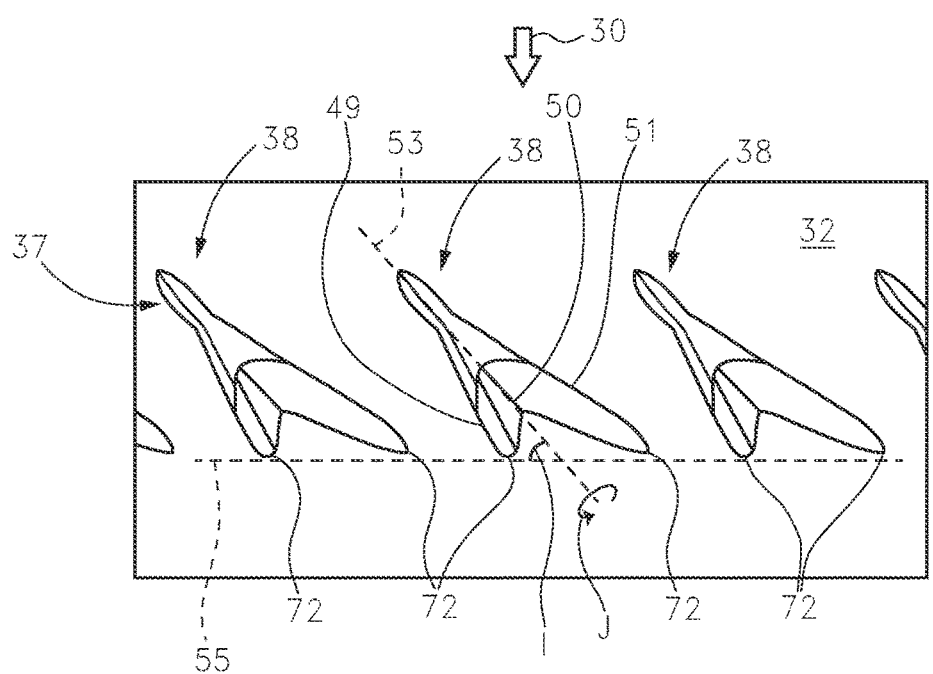
FIG. 13 is an illustration of an alternative row of cooling holes that may be used with the wall shown in FIG. 1.

FIG. 13 illustrates an alternative row 37 of cooling holes 38 that may be used with wall 32. In the exemplary embodiment, cooling hole 38 includes a centerline axis 53, a first channel 49, and a second channel 51. Channels 49 and 51 diverge from ridge 50 and are positioned on opposing sides of centerline axis 53. Further, a transverse axis 55 extends in a transverse direction relative to a flow direction of cooling gases 30.

In the exemplary embodiment, cooling hole 38 is rotated about at least one axis to facilitate changing an orientation of cooling hole 38. For example, cooling hole 38 is rotated such that an angle I is defined between centerline axis 53 and transverse axis 55, and is rotated about centerline axis 53 in a hoop direction J. As such, changing the orientation of cooling holes 38 facilitate changing a depth of each first channel 49 and second channel 51 within wall 32, and facilitate aligning each trailing edge 72 of channels 49 and 51 along transverse axis 55. Aligning each trailing edge 72 enables a substantially uniform flow of pressurized air to be discharged from cooling holes 38. In some embodiments, the degree of rotation to be applied cooling hole 38 in hoop direction J may depend upon angle I of centerline axis 53 relative to transverse axis 55. More specifically, the degree of rotation may be modified to facilitate aligning each trailing edge 72 along transverse axis 55.

Figure 14:
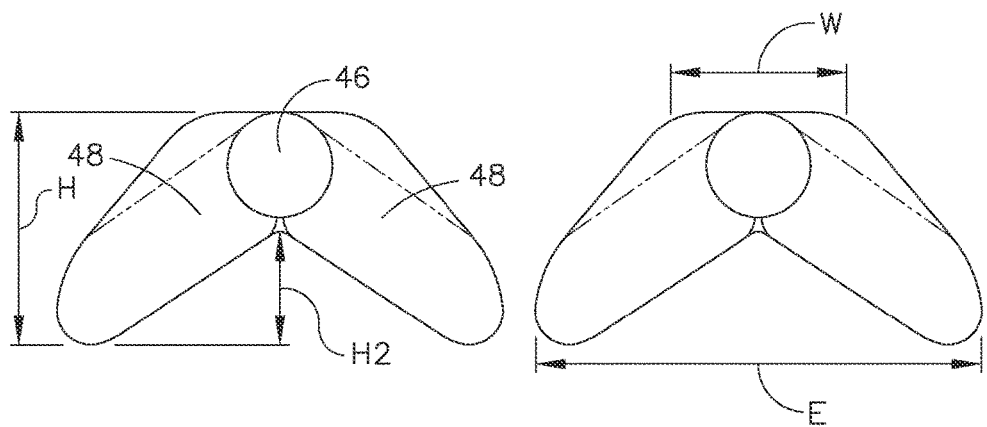
FIG. 14 is an enlarged axial view of the boomerang film cooling holes of FIG. 1.
Figure 15:
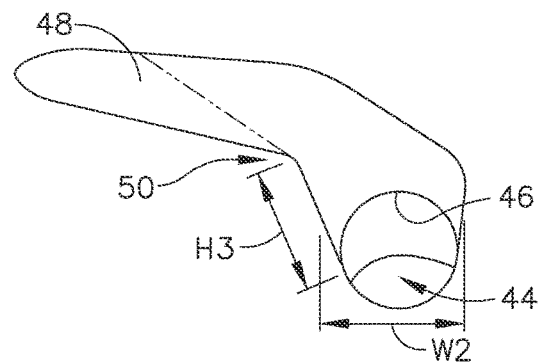
FIG. 15 is an isometric view of the boomerang outlets shown in FIG. 14.

FIGS. 14 and 15 illustrate additional parameters of hole 38 and Table 1 describes an exemplary range of parameters of cooling hole 38. More specifically, in Table 1, t represents the thickness t (shown in FIG. 2) of wall 32, A represents the through hole inclination angle A (shown in FIG. 2), and C represents the layback surface angle i.e., inclination angle C (shown in FIG. 2), at which channel 48 intersects wall outer surface 36. D represents the diameter D (shown in FIG. 2) of inlet bore 44 and L represents the length L (shown in FIG. 2) of inlet bore 44. L2 represents the length L2 (shown in FIG. 2) of hooded diffusion or a distance from outlet end 46 that hole 38 is covered or shielded by wall outer surface 36. When hole 38 is viewed through inlet bore 44, H represents the total height H of hole 38, H2 represents the height H2 of ridge 50, W represents the upstream width W of hole 38, and E represents lateral width E (shown in FIGS. 3 and 6). Further, DFA represents the diffusion angle DFA (shown in FIG. 8) of the outboard edges of channels 48, and DFA2 represents the diffusion angle DFA2 (shown in FIG. 8) of the inboard edges of channels 48, which also represents the angle at which channels 48 diverge. P represents the distance P (shown in FIG. 8) between the centers of adjacent holes 38 and is used to determine air coverage produced by hole 38.

TABLE 1

| Param | Min | Nominal Value | Max |
| --- | --- | --- | --- |
| t (mils) | 15 | 30 | Any |
| A (deg) | 0 | 30 | 90 |
| B (deg) | 0 | 10 | 90 |
| C (deg) | 0 | 10 | 30 |
| D (mils) | 0 | 12 | Any |
| L/D | 0 | 0.5 | Any |
| L2/D | 0 | 2.8 | Any |
| P/D | | 4.2 | Any |
| L (mils) | 0 | 6 | Any |
| L2 (mils) | 0 | 33.2 | Any |
| H (mils) | 0 | 26 | Any |
| H2 (mils) | 0 | 14 | Any |
| H3 (mils) | 0 | 33 | Any |
| E (mils) | 0 | 48 | Any |
| I | 0 | 45 | Any |
| J | 0 | 30 | 90 |
| W (mils) | 0 | 24 | Any |
| W2 (mils) | 0 | 12 | Any |
| DFA (deg) | 0 | 46 | 180 |

TABLE 1-continued

| Param | Min | Nominal Value | Max |
|---|---|---|---|
| DFA2 (deg) | 0 | 75 | 180 |
| Coverage (W/P) | 10% | 95% | 100% |

Table 2 describes exemplary parameters of hole 38, maximo hole 60 and deep boomerang hole 80, respectively.

TABLE 2

| Param | Boomerang | Maximo | Deep Boomerang |
|---|---|---|---|
| t (mils) | 30 | 30 | 30 |
| A (deg) | 30 | 30 | 30 |
| B (deg) | 10 | 15 | 15 |
| D (mils) | 12 | 12 | 12 |
| L/D | 0.5 | 0.5 | 0.5 |
| L2/D | 2.8 | 2.8 | 2.8 |
| P/D | 4.2 | 8.4 | 8.4 |
| L (mils) | 6 | 6 | 6 |
| L2 (mils) | 33.2 | 33.2 | 33.2 |

Tables 3-7 describe a performance $ETA_{AVG}$ of hole 38, maximo hole 60 and deep boomerang hole 80 compared to known hole shapes such as the standard axial shaped hole (ASH), the chevron, the compound angle shaped hole (CASH), the wide ASH, and the deep ASH. Performance $ETA_{AVG}$ is a measure of film effectiveness, i.e. how well the flow exits each hole and protects wall outer surface for a given blowing ratio M. Tables 3-7 describe performance $ETA_{AVG}$ at blowing ratios M of 1, 1.5, 2, 3 and 4, respectively. In Tables 3-7, Δ vs base is a measurement of performance $ETA_{AVG}$ versus the standard ash hole, which is used as a baseline comparison. COVB represents coverage of the specified shape and LBA represents layback angle B. As shown in Tables 3-7, hole 38, maximo hole 60 and deep boomerang hole 80 show marked improvements in performance $ETA_{AVG}$ over existing shapes, particularly at higher blowing ratios M of 2, 3 and 4.

TABLE 3

$ETA_{AVG}$ ~1" engine scale

| M = 1 NUM | CONFIG | $ETA_{AVG}$ | Δ vs BASE | COVB | LBA | DFA |
|---|---|---|---|---|---|---|
| 3 | BOOMERANG | 0.1396 | 2.3% | 0.635 | 10 | 30 |
| 1 | STD ASH | 0.1365 | 0.0% | 0.466 | 10 | 20 |
| 2 | GRC CHEVRON | 0.1351 | -1.0% | 0.466 | 10 | 20 |
| 7 | WIDE ASH | 0.1278 | -6.4% | 0.635 | 10 | 30 |
| 6 | DEEP BOOMER | 0.1265 | -7.5% | 0.804 | 15 | 30 |
| 5 | MAXIMO | 0.1220 | -10.6% | 0.804 | 15 | 30 |
| 4 | CASH | 0.1095 | -19.8% | 0.588 | 10 | 20 |
| 8 | DEEP ASH | 0.1055 | -22.7% | 0.640 | 15 | 20 |

TABLE 4

$ETA_{AVG}$ ~1" engine scale

| M = 1.5 NUM | CONFIG | $ETA_{AVG}$ | Δ vs BASE | COVB | LBA | DFA |
|---|---|---|---|---|---|---|
| 3 | BOOMERANG | 0.1744 | 5.4% | 0.635 | 10 | 30 |
| 7 | WIDE ASH | 0.1672 | 1.0% | 0.635 | 10 | 30 |
| 6 | DEEP BOOMER | 0.1657 | 0.2% | 0.804 | 15 | 30 |
| 1 | STD ASH | 0.1655 | 0.0% | 0.466 | 10 | 20 |
| 2 | GRC CHEVRON | 0.1620 | -2.1% | 0.466 | 10 | 20 |
| 5 | MAXIMO | 0.1602 | -3.2% | 0.804 | 15 | 30 |
| 4 | CASH | 0.1357 | -18.0% | 0.588 | 10 | 20 |
| 8 | DEEP ASH | 0.1340 | -19.0% | 0.640 | 15 | 20 |

TABLE 5

$ETA_{AVG}$ ~1" engine scale

| M = 2 NUM | CONFIG | $ETA_{AVG}$ | Δ vs BASE | COVB | LBA | DFA |
|---|---|---|---|---|---|---|
| 3 | BOOMERANG | 0.1920 | 10.3% | 0.635 | 10 | 30 |
| 6 | DEEP BOOMER | 0.1002 | 9.3% | 0.804 | 15 | 30 |
| 7 | WIDE ASH | 0.1888 | 8.5% | 0.635 | 10 | 30 |
| 5 | MAXIMO | 0.1877 | 7.9% | 0.804 | 15 | 30 |
| 1 | STD ASH | 0.1740 | 0.0% | 0.466 | 10 | 20 |
| 2 | GRC CHEVRON | 0.1693 | -2.7% | 0.466 | 10 | 20 |
| 4 | CASH | 0.1488 | -14.5% | 0.558 | 10 | 20 |
| 8 | DEEP ASH | 0.1477 | -15.1% | 0.640 | 15 | 20 |

TABLE 6

$ETA_{AVG}$ ~1" engine scale

| M = 3 NUM | CONFIG | $ETA_{AVG}$ | Δ vs BASE | COVB | LBA | DFA |
|---|---|---|---|---|---|---|
| 5 | MAXIMO | 0.2224 | 41.0% | 0.804 | 15 | 30 |
| 7 | WIDE ASH | 0.2099 | 33.1% | 0.635 | 10 | 30 |
| 6 | DEEP BOOMER | 0.2099 | 33.1% | 0.804 | 15 | 30 |
| 3 | BOOMERANG | 0.2004 | 27.1% | 0.635 | 10 | 30 |
| 2 | GRC CHEVRON | 0.1583 | 0.4% | 0.466 | 10 | 20 |
| 1 | STD ASH | 0.1577 | 0.0% | 0.466 | 10 | 20 |
| 4 | CASH | 0.1545 | -2.0% | 0.558 | 10 | 20 |
| 8 | DEEP ASH | 0.1533 | -2.8% | 0.640 | 15 | 20 |

TABLE 7

$ETA_{AVG}$ ~1" engine scale

| M = 4 NUM | CONFIG | $ETA_{AVG}$ | Δ vs BASE | COVB | LBA | DFA |
|---|---|---|---|---|---|---|
| 5 | MAXIMO | 0.2397 | 56.6% | 0.804 | 15 | 30 |
| 7 | WIDE ASH | 0.2285 | 49.2% | 0.635 | 10 | 30 |
| 6 | DEEP BOOMER | 0.2137 | 39.6% | 0.804 | 15 | 30 |
| 3 | BOOMERANG | 0.2091 | 36.6% | 0.635 | 10 | 30 |
| 4 | CASH | 0.1557 | 1.7% | 0.588 | 10 | 20 |
| 1 | STD ASH | 0.1531 | 0.0% | 0.466 | 10 | 20 |
| 2 | GRC CHEVRON | 0.1516 | -0.9% | 0.466 | 10 | 20 |
| 8 | DEEP ASH | 0.1129 | -26.2% | 0.640 | 15 | 20 |

As described, the boomerang configuration of hole 38, maximo hole 60, and deep boomerang hole 80 provide axial and lateral diffusion of pressurized air 28 to facilitate providing a film of cooling air over wall outer surface 36 to separate hot combustion gases therefrom. Compared to known cooling holes, the boomerang configuration provides increased surface area coverage and attachment over wall outer surface 36 without increasing the amount of air required, resulting in reduced blow-off and increased efficiency. In addition, overall performance is increased compared to known cooling holes, particularly at high blowing ratios.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A gas turbine engine wall comprising:
an inner surface and an opposing outer surface having at least one film cooling hole defined therein, wherein said at least one film cooling hole comprises an inclined inlet bore that extends from said inner surface and a pair of channels that diverge laterally from an outlet end of said inclined inlet bore, wherein said pair of channels have a substantially constant width and are separated by a ridge to form a boomerang cross-sectional shape, wherein said ridge begins at a location spaced at a distance from the outlet end and separates a pressurized air at the ridge and decreases in depth as said ridge extends towards said outer surface and wherein an inclination angle of said ridge is at least initially smaller than an inclination angle of the inlet bore and said ridge decreases in depth in an arcuate profile.

2. The wall in accordance with claim 1, wherein at least one of said pair of channels comprises a floor that has a substantially rounded cross-sectional shape.

3. The wall in accordance with claim 1, wherein at least one of said pair of channels have a width that is substantially similar to a diameter of said inclined inlet bore.

4. The wall in accordance with claim 1, wherein said ridge comprises an edge defined at a floor of said pair of channels, said edge separated by a distance from the outlet end of said inclined inlet bore.

5. The wall in accordance with claim 1, wherein said ridge comprises a substantially constant width.

6. The wall in accordance with claim 1, wherein said pair of channels decrease in depth with a substantially constant incline from the outlet end of said inclined inlet bore towards said outer surface.

7. The wall in accordance with claim 1, wherein said pair of channels have an inclination angle that is shallower than the inclination angle of said ridge.

8. A gas turbine engine wall comprising:
an inner surface and an opposing outer surface having at least one film cooling hole defined therein, wherein said at least one film cooling hole comprises an inclined inlet bore that extends from said inner surface and a pair of channels that diverge laterally from an outlet end of said inclined inlet bore, wherein said pair of channels have a substantially planar floor and are separated by a ridge to form a boomerang cross-sectional chapel wherein said ridge begins at a location spaced at a distance from the outlet end and separates a pressurized air at the ridge and decreases in depth as said ridge extends towards said outer surface and wherein an inclination angle of said ridge is initially smaller than an inclination angle of the inlet bore and said inclination angle of said ridge changes over the length of the ridge in an arcuate profile.

9. The wall in accordance with claim 8, wherein said substantially planar floor diverges in width from the outlet end of said inclined inlet bore towards a trailing edge of said pair of channels.

10. The wall in accordance with claim 8, wherein said ridge decreases in depth with an increasing incline as said ridge extends towards said outer surface.

11. The wall in accordance with claim 8, wherein said pair of channels comprise at least one side wall that extends from said substantially planar floor to said outer surface.

12. The wall in accordance with claim 11, wherein said at least one side wall comprises a pair of side walls that extend from opposing edges of said substantially planar floor, said pair of side walls diverge from said substantially planar floor towards said outer surface.

13. The wall in accordance with claim 8, wherein said pair of channels diverge at an angle of between about 20° to about 100°.

14. The wall in accordance with claim 8, wherein said pair of channels are configured to divide and diffuse a flow of air discharged from said inclined inlet bore.

* * * * *